(12) United States Patent
Yoon et al.

(10) Patent No.: US 12,374,757 B2
(45) Date of Patent: Jul. 29, 2025

(54) ELECTRODE ASSEMBLY

(71) Applicant: LG Energy Solution, Ltd., Seoul (KR)

(72) Inventors: Se Hyun Yoon, Daejeon (KR); Beomsu Kim, Daejeon (KR); Heeyong Kim, Daejeon (KR); Yong Nam Kim, Daejeon (KR); Jeongwoo Hong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 275 days.

(21) Appl. No.: 17/860,725

(22) Filed: Jul. 8, 2022

(65) Prior Publication Data
US 2023/0020972 A1    Jan. 19, 2023

(30) Foreign Application Priority Data

Jul. 9, 2021  (KR) .................. 10-2021-0090588
Jul. 9, 2021  (KR) .................. 10-2021-0090589

(Continued)

(51) Int. Cl.
*H01M 50/46* (2021.01)
*H01M 4/04* (2006.01)
(Continued)

(52) U.S. Cl.
CPC ........... *H01M 50/46* (2021.01); *H01M 4/043* (2013.01); *H01M 4/0471* (2013.01);
(Continued)

(58) Field of Classification Search
CPC . H01M 50/40–429; H01M 50/46–466; H01M 50/489–497; H01M 4/02;
(Continued)

(56) References Cited

U.S. PATENT DOCUMENTS 9,209,491 B2   12/2015   Kim et al.
9,793,535 B2   10/2017   Yu et al.
(Continued)

FOREIGN PATENT DOCUMENTS

CN   002763997 Y   3/2006
CN   210403945 U   4/2020
(Continued)

OTHER PUBLICATIONS

International Search Report for Application No. PCT/KR2022/010010 mailed Oct. 28, 2022, pp. 1-3.
(Continued)

*Primary Examiner* — Nicole M. Buie-Hatcher
*Assistant Examiner* — Jacob Buchanan
(74) *Attorney, Agent, or Firm* — Lerner David LLP

(57) ABSTRACT

An electrode assembly includes a plurality of electrodes arranged in a stack along a stacking axis, where each of the electrodes in the stack is separated along the stacking axis from a successive one of the electrodes in the stack by a respective separator portion positioned therebetween. At least one outer surface of the stack may include a pattern defining a first region and a second region, where a second portion of the stack corresponding to the second region has a different property or height from a first portion of the stack corresponding to the first region. The property may include any one of shading or color of the at least one outer surface of the stack, air permeability of the separator portions in the first and second regions, and adhesive force between the electrodes and separator portions in the first and second regions.

30 Claims, 6 Drawing Sheets

(30) Foreign Application Priority Data

| Jul. 9, 2021 | (KR) | 10-2021-0090590 |
| Jul. 9, 2021 | (KR) | 10-2021-0090591 |
| Jul. 9, 2021 | (KR) | 10-2021-0090592 |
| Jul. 9, 2021 | (KR) | 10-2021-0090596 |
| Jul. 9, 2021 | (KR) | 10-2021-0090597 |
| Jul. 9, 2021 | (KR) | 10-2021-0090598 |
| Jul. 9, 2021 | (KR) | 10-2021-0090600 |
| Jul. 9, 2021 | (KR) | 10-2021-0090601 |

(51) Int. Cl.
- H01M 10/04 (2006.01)
- H01M 10/0525 (2010.01)
- H01M 10/0583 (2010.01)
- H01M 50/463 (2021.01)
- H01M 50/466 (2021.01)

(52) U.S. Cl.
CPC ... *H01M 10/0404* (2013.01); *H01M 10/0431* (2013.01); *H01M 10/045* (2013.01); *H01M 10/0459* (2013.01); *H01M 10/0468* (2013.01); *H01M 10/0583* (2013.01); *H01M 50/463* (2021.01); *H01M 50/466* (2021.01); *H01M 10/0525* (2013.01)

(58) Field of Classification Search
CPC .......... H01M 4/04; H01M 4/13–133; H01M 4/139–1393; H01M 10/04–0409; H01M 10/0422; H01M 10/0431; H01M 10/045; H01M 10/0459; H01M 10/0468; H01M 10/0481; H01M 10/05–0525; H01M 10/058–0585

See application file for complete search history.

(56) References Cited

U.S. PATENT DOCUMENTS

| 10,333,126 | B2 | 6/2019 | Joo et al. |
| 10,985,356 | B2 | 4/2021 | Joo et al. |
| 2004/0180250 | A1 | 9/2004 | Nanaumi et al. |
| 2005/0186479 | A1 | 8/2005 | Totsuka et al. |
| 2006/0019154 | A1 | 1/2006 | Imachi et al. |
| 2007/0202394 | A1 | 8/2007 | Viavattine |
| 2008/0280208 | A1 | 11/2008 | Naoi et al. |
| 2009/0029259 | A1 | 1/2009 | Okazaki et al. |
| 2009/0136844 | A1 | 5/2009 | Watanabe et al. |
| 2010/0167176 | A1 | 7/2010 | Kawai |
| 2011/0052964 | A1* | 3/2011 | Kim ............... H01M 10/0583 429/152 |
| 2011/0104550 | A1 | 5/2011 | Ahn et al. |
| 2013/0306237 | A1 | 11/2013 | Nagasaka et al. |
| 2014/0050958 | A1 | 2/2014 | Kwon et al. |
| 2014/0205879 | A1 | 7/2014 | Jang et al. |
| 2015/0033527 | A1 | 2/2015 | Park et al. |
| 2015/0162638 | A1 | 6/2015 | Bernini et al. |
| 2015/0180082 | A1 | 6/2015 | Jung et al. |
| 2015/0188108 | A1* | 7/2015 | Miyazawa .......... H01M 50/443 156/60 |
| 2016/0006072 | A1 | 1/2016 | Cho et al. |
| 2016/0028064 | A1 | 1/2016 | Choi et al. |
| 2016/0036087 | A1 | 2/2016 | Na et al. |
| 2016/0285062 | A1 | 9/2016 | Jo et al. |
| 2016/0380301 | A1 | 12/2016 | Kosaka et al. |
| 2017/0125794 | A1 | 5/2017 | Zhao et al. |
| 2018/0076424 | A1 | 3/2018 | Kato |
| 2018/0090787 | A1 | 3/2018 | Makino et al. |
| 2018/0102568 | A1 | 4/2018 | Otohata |
| 2018/0205109 | A1 | 7/2018 | Cho et al. |
| 2018/0226623 | A1 | 8/2018 | Cho et al. |
| 2018/0233725 | A1 | 8/2018 | Yasuda et al. |
| 2018/0233752 | A1 | 8/2018 | Herrmann et al. |
| 2018/0248219 | A1* | 8/2018 | Kim ............... H01M 10/0481 |
| 2018/0294509 | A1 | 10/2018 | Liu et al. |
| 2018/0342722 | A1* | 11/2018 | Zeng ............... H01M 50/548 |
| 2019/0020009 | A1 | 1/2019 | Watanabe et al. |
| 2019/0044177 | A1 | 2/2019 | Lee et al. |
| 2019/0051924 | A1 | 2/2019 | Kim et al. |
| 2020/0006733 | A1 | 1/2020 | Cho et al. |
| 2020/0127334 | A1 | 4/2020 | Pyo et al. |
| 2020/0185753 | A1 | 6/2020 | Kwon |
| 2020/0227787 | A1 | 7/2020 | Kang et al. |
| 2020/0227788 | A1 | 7/2020 | Chun et al. |
| 2020/0235434 | A1 | 7/2020 | Lee et al. |
| 2020/0335813 | A1 | 10/2020 | Oh et al. |
| 2021/0050616 | A1 | 2/2021 | Taguchi et al. |
| 2021/0104775 | A1 | 4/2021 | Ono et al. |
| 2021/0351431 | A1 | 11/2021 | Hwang |
| 2022/0006161 | A1 | 1/2022 | Kim et al. |
| 2022/0029246 | A1* | 1/2022 | Watanabe ......... H01M 10/0525 |
| 2022/0393225 | A1 | 12/2022 | Kim et al. |
| 2023/0006262 | A1 | 1/2023 | Maruhashi et al. |
| 2023/0036396 | A1 | 2/2023 | Hosokawa et al. |

FOREIGN PATENT DOCUMENTS

| EP | 2856552 | B1 | 5/2016 |
| EP | 3905417 | A1 | 11/2021 |
| EP | 3985778 | A1 | 4/2022 |
| EP | 4027421 | A1 | 7/2022 |
| JP | S45-005056 | Y1 | 3/1970 |
| JP | h02046663 | A | 2/1990 |
| JP | H08138722 | A | 5/1996 |
| JP | 2002-208442 | A | 7/2002 |
| JP | 2002367628 | A | 12/2002 |
| JP | 2003-151615 | A | 5/2003 |
| JP | 2003201352 | A | 7/2003 |
| JP | 2005243455 | A | 9/2005 |
| JP | 2006032246 | A | 2/2006 |
| JP | 2008-091192 | A | 4/2008 |
| JP | 2008282739 | A | 11/2008 |
| JP | 2009-218105 | A | 9/2009 |
| JP | 2009259719 | A | 11/2009 |
| JP | 2010199281 | A | 9/2010 |
| JP | 2012033275 | A | 2/2012 |
| JP | 2013-149477 | A | 8/2013 |
| JP | 2013-254629 | A | 12/2013 |
| JP | 2015-141791 | A | 8/2015 |
| JP | 2015531989 | A | 11/2015 |
| JP | 2015532766 | A | 11/2015 |
| JP | 2016103425 | A | 6/2016 |
| JP | 2017-016946 | A | 1/2017 |
| JP | 2018-018712 | A | 2/2018 |
| JP | 2018-41703 | A | 3/2018 |
| JP | 2018510472 | A | 4/2018 |
| JP | 2018-181843 | A | 11/2018 |
| JP | 2018-532240 | A | 11/2018 |
| JP | 2019153427 | A | 9/2019 |
| JP | 2019199028 | A | 11/2019 |
| JP | 2020145123 | A | 9/2020 |
| JP | 6844476 | B2 | 3/2021 |
| KR | 2008-0063523 | A | 7/2008 |
| KR | 20100051353 | A | 5/2010 |
| KR | 20110048132 | A | 5/2011 |
| KR | 101058786 | B1 | 8/2011 |
| KR | 101209010 | B1 | 12/2012 |
| KR | 20130132230 | A | 12/2013 |
| KR | 20140002718 | A | 1/2014 |
| KR | 20140022447 | A | 2/2014 |
| KR | 2014-0060797 | A | 5/2014 |
| KR | 2014-0064405 | A | 5/2014 |
| KR | 20140062761 | A | 5/2014 |
| KR | 20150016671 | A | 2/2015 |
| KR | 20150020667 | A | 2/2015 |
| KR | 2015-0022264 | A | 3/2015 |
| KR | 2015-0035079 | A | 4/2015 |
| KR | 20150034944 | A | 4/2015 |
| KR | 20150049892 | A | 5/2015 |
| KR | 20150050505 | A | 5/2015 |
| KR | 101531234 | B1 | 6/2015 |
| KR | 20150144183 | A | 12/2015 |
| KR | 101595621 | B1 | 2/2016 |

(56) References Cited

FOREIGN PATENT DOCUMENTS

| | | | |
|---|---|---|---|
| KR | 20160054219 A | 5/2016 |
| KR | 101643593 B1 | 7/2016 |
| KR | 20160108116 A | 9/2016 |
| KR | 101704759 B1 | 2/2017 |
| KR | 101761720 B1 | 7/2017 |
| KR | 101784033 B1 | 10/2017 |
| KR | 2017-0124336 A | 11/2017 |
| KR | 20180006324 A | 1/2018 |
| KR | 101826894 B1 | 2/2018 |
| KR | 101838350 B1 | 3/2018 |
| KR | 20180037847 A | 4/2018 |
| KR | 20180061872 A | 6/2018 |
| KR | 20180128770 A | 12/2018 |
| KR | 101941144 B1 | 1/2019 |
| KR | 101963313 B1 | 3/2019 |
| KR | 20190054491 A | 5/2019 |
| KR | 20190056812 A | 5/2019 |
| KR | 20190064977 A | 6/2019 |
| KR | 101995038 B1 | 7/2019 |
| KR | 102044363 B1 | 11/2019 |
| KR | 20200023852 A | 3/2020 |
| KR | 20200023853 A | 3/2020 |
| KR | 20200023854 A | 3/2020 |
| KR | 20200036641 A | 4/2020 |
| KR | 20200061033 A | 6/2020 |
| KR | 20200067575 A | 6/2020 |
| KR | 20200069171 A | 6/2020 |
| KR | 20200094325 A | 8/2020 |
| KR | 20200095896 A | 8/2020 |
| KR | 102164576 B1 | 10/2020 |
| KR | 20200145375 A | 12/2020 |
| KR | 20210033327 A | 3/2021 |
| KR | 102253132 B1 | 5/2021 |
| KR | 20210049297 A | 5/2021 |
| KR | 20210051155 A | 5/2021 |
| KR | 20210051164 A | 5/2021 |
| KR | 2021-0074026 A | 6/2021 |
| KR | 102256438 B1 | 6/2021 |
| KR | 102265741 B1 | 6/2021 |
| KR | 20210135861 A | 11/2021 |
| WO | 2006120959 A1 | 11/2006 |
| WO | 2016-152922 A1 | 9/2016 |
| WO | 2017018456 A1 | 2/2017 |
| WO | 2017/149991 A1 | 9/2017 |
| WO | 2018116295 A1 | 6/2018 |
| WO | 2019188719 A1 | 10/2019 |
| WO | 2021/131879 A1 | 7/2021 |

OTHER PUBLICATIONS

International Search Report for Application No. PCT/KR2022/010006 mailed Nov. 4, 2022, pp. 1-3.
Written Opinion of the ISA for PCT/KR2022/010004 mailed Oct. 26, 2022. 4 pgs.
Written Opinion of the ISA for PCT/KR2022/010003 mailed Nov. 2, 2022. 3 pgs.
Written Opinion of the ISA for PCT/KR2022/010000 mailed Oct. 26, 2022. 4 pgs.
Notice of Preliminary Rejection for Korean Application No. 10-2022-0084662 dated Jan. 1, 2023. 8 pgs.
International Search Report for Application No. PCT/KR2022/010001 mailed Nov. 8, 2022, pp. 1-3.
International Search Report for Application No. PCT/KR2022/010005 mailed Nov. 8, 2022, pp. 1-3.
International Search Report for Application No. PCT/KR2022/010007 mailed Oct. 28, 2022, pp. 1-3.
International Search Report for Application No. PCT/KR2022/010008 mailed Nov. 4, 2022, pp. 1-3.
International Search Report for Application No. PCT/KR2022/010009 mailed Nov. 4, 2022, pp. 1-3.
Extended European Search Report including Written Opinion for Application No. 22838071.3 dated Jun. 24, 2024, pp. 1-8.
Extended European Search Report for Application No. 22838066.3 dated Aug. 5, 2024, pp. 1-5.

* cited by examiner

ELECTRODE ASSEMBLY

CROSS-REFERENCE TO RELATED APPLICATIONS

This application claims priority from Korean Patent Application No. 10-2021-0090588 filed on Jul. 9, 2021, Korean Patent Application No. 10-2021-0090589 filed on Jul. 9, 2021, Korean Patent Application No. 10-2021-0090590 filed on Jul. 9, 2021, Korean Patent Application No. 10-2021-0090591 filed on Jul. 9, 2021, Korean Patent Application No. 10-2021-0090592 filed on Jul. 9, 2021, Korean Patent Application No. 10-2021-0090596 filed on Jul. 9, 2021, Korean Patent Application No. 10-2021-0090597 filed on Jul. 9, 2021, Korean Patent Application No. 10-2021-0090598 filed on Jul. 9, 2021, Korean Patent Application No. 10-2021-0090600 filed on Jul. 9, 2021, and Korean Patent Application No. 10-2021-0090601 filed on Jul. 9, 2021 the entire contents of all of which are incorporated herein by reference.

FIELD OF THE INVENTION

The present invention relates to an electrode assembly. More particularly, the present invention relates to an electrode assembly of a secondary battery.

BACKGROUND ART

Secondary batteries, unlike primary batteries, are rechargeable, and have been widely researched and developed in recent years due to their small size and large capacity. As technology development and demand for mobile devices increase, the demand for secondary batteries as an energy source is rapidly increasing.

Secondary batteries can be classified into a coin-type battery, a cylindrical battery, a prismatic battery, and a pouch-type battery, according to the shape of the battery case. In a secondary battery, an electrode assembly mounted inside a battery case is a chargeable/dischargeable power generating element having a stacked structure comprising electrodes and separators.

The electrode assembly may be generally classified into a jelly-roll type, a stack type, and a stack-and-folding type. In the jelly-roll type, a separator is interposed between a sheet type positive electrode and a sheet type negative electrode, each of which are coated with an active material, and the entire arrangement is wound. In the stack type, a plurality of positive and negative electrodes are sequentially stacked with a separator interposed therebetween. In a stack-and-folding type, stacked unit cells are wound with a long-length separation film.

In the process of manufacturing a stack-and-folding type electrode assembly in the related art, the electrodes and the separator stacked in the electrode assembly are bonded to each other so as to hold the completed stack together, so that it can be transported as a unit without falling apart (e.g., in order to be moved into a battery case). Such bonding may be done via the application of heat and pressure to the assembled stack. However, in the electrode assembly manufacturing process in the related art, there are problems in that the electrodes in the stack can become distorted or misaligned during that application of heat and pressure.

In order to solve such problems of in the related art, the electrodes and separator have been bonded to each other during the stacking process by applying heat and pressure to the stack after the addition of each new level to the stack. However, that results in a problem in that the adhesive force between the electrodes and separator diverges greatly along the stacking direction due to the accumulation of heat and pressure by the lowest components of the stack with each new application of heat and pressure, whereas the upper components of the stack have comparatively much lower adhesive force. That nonuniformity along the stacking direction can lead to negative impacts on the electrode assembly. For example, the lowest separators (which have accumulated the most heat and pressure) can have reduced porosity, which leads to poorer performance in use, whereas the upper separators may be bonded relatively weakly to the adjacent electrodes.

SUMMARY OF THE INVENTION

The present invention provides, among other things, an electrode assembly manufactured by applying pressure and heat to the entire stack after the components of the stack have been assembled together, rather than applying heat and pressure to the stack at each step in the process. As a result, the completed electrode assembly may have better stability (though more effective bonding), while also having improved uniformity.

An exemplary aspect of the present invention provides an electrode assembly. The electrode assembly in accordance with such aspect of the invention preferably includes a plurality of electrodes arranged in a stack along a stacking axis, where each of the electrodes in the stack is separated along the stacking axis from a successive one of the electrodes in the stack by a respective separator portion positioned therebetween. At least one outer surface of the stack may include a pattern defining a first region and a second region, where a second portion of the stack corresponding to the second region has a different property or height from a first portion of the stack corresponding to the first region.

In accordance with some aspects of the invention, the different property may include any one of shading or color of the at least one outer surface of the stack, air permeability of the separator portions in the first and second regions, and adhesive force between the electrodes and separator portions in the first and second regions.

In accordance with some aspects of the invention, the separator portions may be portions of an elongated separator sheet. The elongated separator may be folded between each separator portion such that the elongated separator sheet follows a serpentine path traversing back and forth along an orthogonal dimension orthogonal to the stacking axis to extend between each of the successive electrodes in the stack. Each of the electrodes in the stack may have a first lateral end and a second lateral end on opposite sides of the respective electrode in the orthogonal dimension.

According to the electrode assembly according to the exemplary embodiments of the present invention, it is possible to prevent the electrode from being misaligned due to press by fixing the stack in which the electrode and the separator are stacked and then heating and pressing the stack.

After a member fixing the stack is removed, adhesive force is provided to a portion of which adhesive force is not secured because the portion is not heated and pressed by the member fixing the stack by heating and pressing the stack, thereby securing uniform adhesive force of the electrode assembly.

DETAILED DESCRIPTION

The detailed description of the present invention is intended to completely explain the present invention to those skilled in the art. Throughout the specification, when it is said that a part "includes" a certain element or that a specific structure or shape is "characterized," this does not mean, unless otherwise noted, that other components or other structures are excluded. Rather, other components, structures and shapes may indeed be included.

Since the present invention may be variously transformed and may have various exemplary embodiments, specific exemplary embodiments are presented and described in detail in the detailed description. However, this is not intended to limit the scope of the invention, which should be understood to include all transformations, equivalents, and substitutes consistent with the spirit and scope of the present invention.

Hereinafter, the present invention will be described in detail with reference to the drawings. However, the drawings are for illustrating the present invention, and the scope of the present invention is not limited by the drawings.

Figure 1:
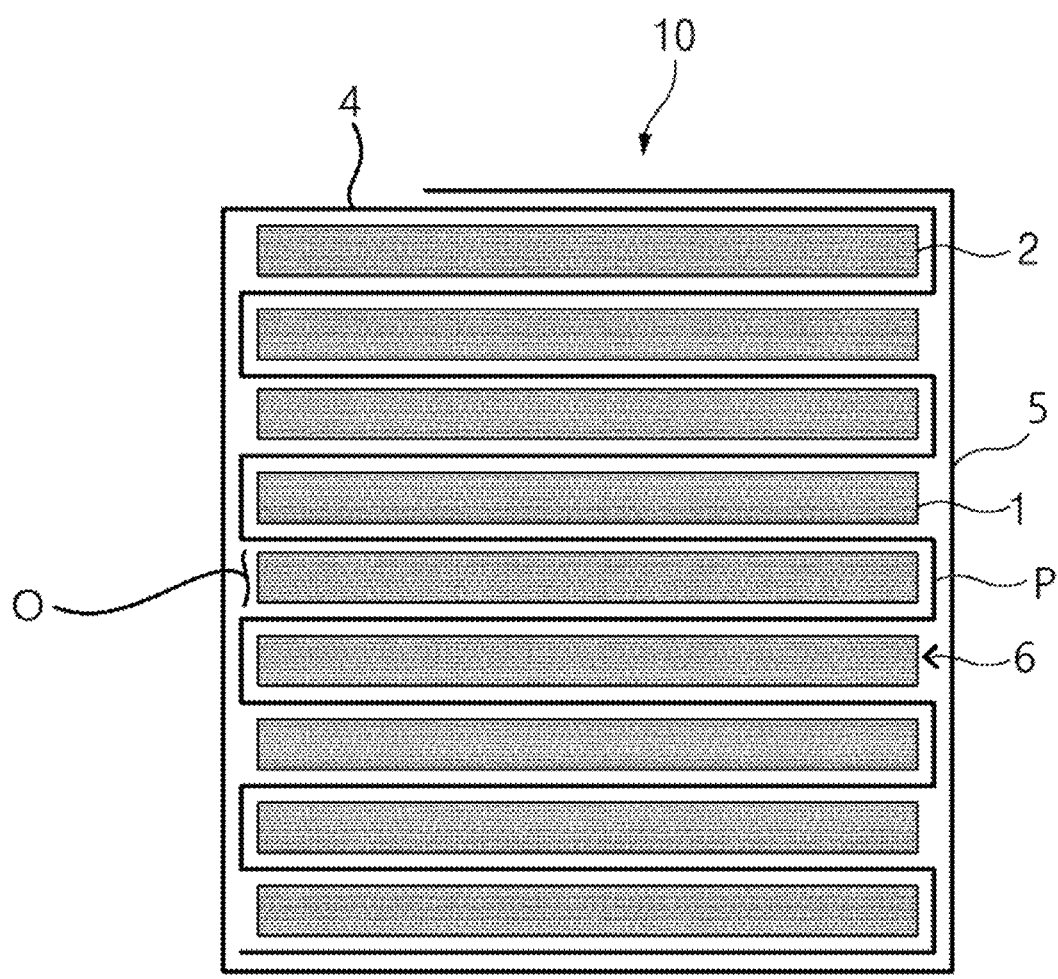
FIG. 1 is a cross-sectional view illustrating an electrode assembly according to an exemplary embodiment of the present invention.
Figure 2:
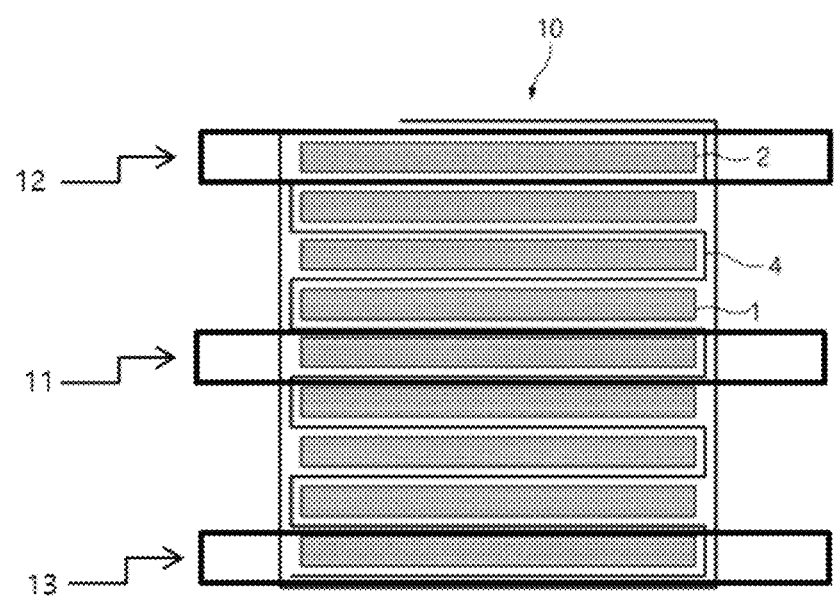
FIG. 2 is a cross-sectional view of the electrode assembly of FIG. 1, illustrating positions of an upper surface, a lower surface, and a middle portion of the electrode assembly.
Figure 3:
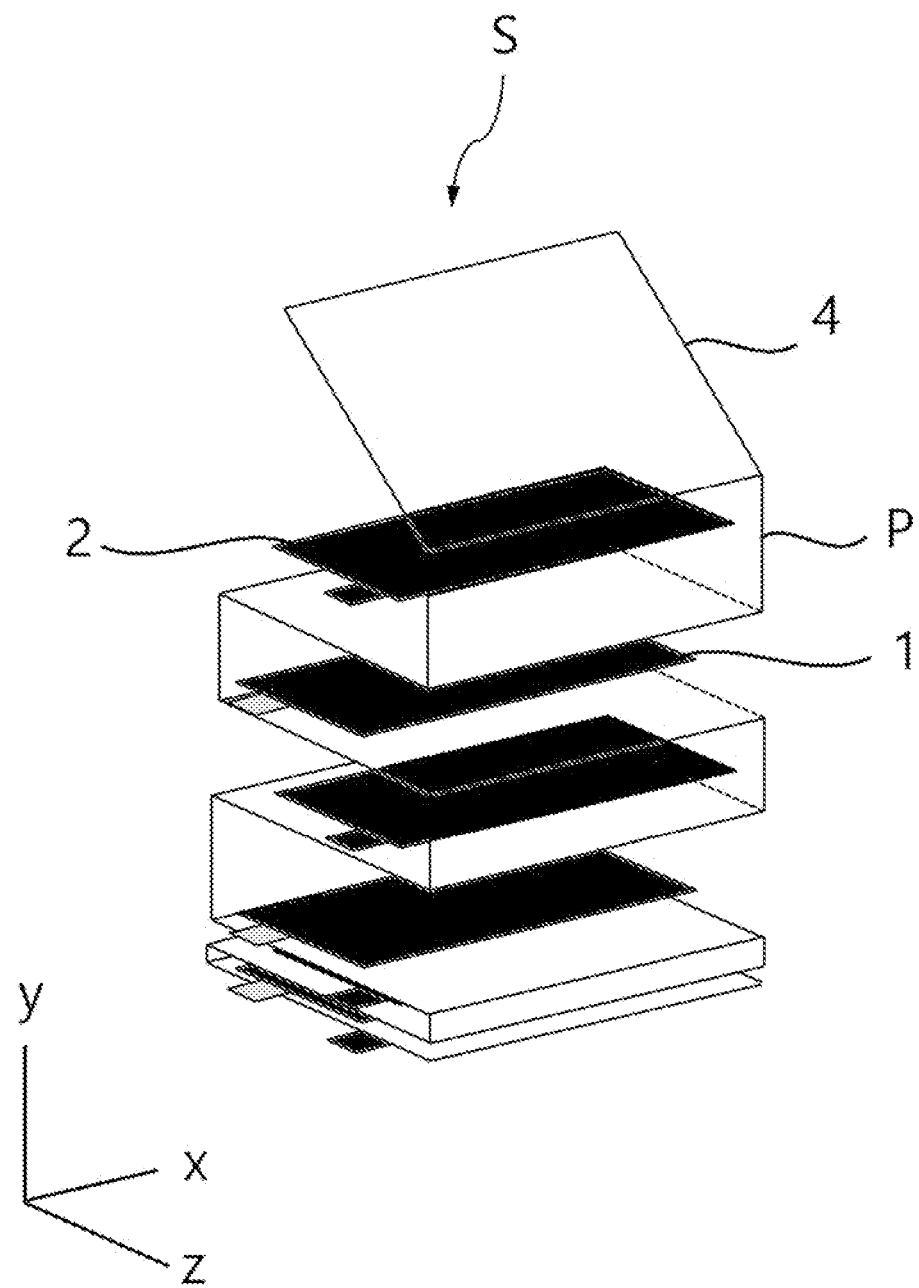
FIG. 3 is a perspective view conceptually illustrating the stacking of components of an electrode assembly according to an exemplary embodiment of the present invention.

FIG. 1 is a cross-sectional view illustrating an electrode assembly 10 according to an exemplary embodiment of the present invention, and FIG. 2 is a perspective view illustrating the stacking of electrodes 1, 2, and a separator 4 into a stack S of the electrode assembly 10 according to an exemplary embodiment of the present invention.

The electrode assembly 10 according to the exemplary embodiment of the present invention is a chargeable/dischargeable power generating device, and the electrode assembly 10 may be provided in the structure of a stack S in which electrodes are disposed between portions of an elongated separator 4 that is folded in a zigzag manner such that the separator 4 follows a serpentine profile extending between each of the electrodes along the stacking direction Y. In this case, the electrodes may include one or more first electrodes 1 and one or more second electrodes 2 alternating with one another along the stacking direction Y.

The serpentine profile of the separator 4 along the stacking direction Y may be defined by successive folded portions P of the separator 4, such that each folded portion P of the separator 4 wraps around one end 6 of an electrode in the lateral dimension Z (orthogonal to the stacking direction Y) before the separator 4 passes between that electrode and the next adjacent electrode in the stack S while extending to the opposing lateral side of the stack S. The portions of the separator 4 extending between each electrode in the stack S may be referred to as stacking portions of the separator 4.

Thus, each level of the stack S (defined by the position of each electrode along the stack S) may be characterized by a folded portion P of the separator 4 surrounding the lateral end 6 of the electrode on one side of the electrode in the lateral dimension Z, while the opposite side of the electrode along the lateral dimension Z may be defined by an open region O characterized by the absence of the separator 4 (including any folded portion P). The folded portions P, like the open regions on the opposite side of the stack S, may thus alternate their positions on opposing lateral sides of the stack S for each successive level of the stack.

As discussed further herein, an "upper surface" of the electrode assembly 10 refers to the uppermost position of the electrode assembly 10 in the stacking direction of the electrode assembly, which is designated by reference numeral 12 in FIG. 2. Further, as discussed herein, a "lower surface" of the electrode assembly 10 refers to the lowermost position of the electrode assembly 10 in the stacking direction of the electrode assembly, which is designated by reference numeral 13 in FIG. 2. Finally, as discussed herein, the "middle" of the electrode assembly 10 refers to a middle position between the upper surface and the lower surface of the electrode assembly 10 in the stacking direction of the electrode assembly, as designated by reference numeral 11 in FIG. 2. For example, when an electrode assembly 10 formed of nine electrodes and viewed from the side, as in FIG. 2, the "middle" position relates to the position of the fifth electrode in the stack S. Thus, subsequent references to "middle air permeability" relate to air permeability of the separator 4 abutting the middle electrode in the electrode assembly. Likewise, subsequent references to "middle adhesive force" refer the adhesive force between the middle electrode in the electrode assembly and the abutting portion of the separator 4.

The electrode assembly 10 may be provided in a form in which an outer circumference thereof is surrounded by an outer separator 5, which may be a portion (e.g., a tail end) of the same elongated separator 4 that follows the zigzag or serpentine profile along the stack S, as discussed above. In one example, the outer circumference of the electrode assembly 10 surrounded by the outer separator 5 is the upper surface and the lower surface in the stacking direction Y, as well as at least one pair of opposing side surfaces in the lateral dimension Z. Here, the upper surface of the stack S may mean the outer surface forming the upper side of the stack S in the stacking direction Y, and the lower surface may mean the outer surface forming the lower side of the stack S, opposite to the upper surface.

In some arrangements of the present invention, the positive electrode may be manufactured by, for example, coating a positive electrode current collector with a positive electrode coating mixture comprising a positive electrode active material, a conductive material, and a binder and then drying the coating mixture. If necessary, a filler may be added to the mixture. Such materials may be any materials used in the relevant field, in particular those commonly used for the particular application.

For example, the positive electrode active material may include: layered compounds, such as lithium cobalt oxide ($LiCoO_2$) and lithium nickel oxide ($LiNiO_2$), or compounds substituted with one or more transition metals; lithium manganese oxides represented by the chemical formula $Li_{1+x}Mn_{2-x}O_4$ (where x is 0 to 0.33), such as $LiMnO_3$, $LiMn_2O_3$, and $LiMnO_2$; lithium copper oxide ($Li_2CuO_2$); vanadium oxides, such as $LiV_3O_8$, $LiFe_3O_4$, $V_2O_5$, and $Cu_2V_2O_7$; Nickel (Ni) site-type lithium nickel oxide represented by the chemical formula $LiNi_{1-x}M_xO_2$ (wherein M=Co, Mn, Al, Cu, Fe, Mg, B or Ga, and x=0.01 to 0.3); lithium manganese composite oxides represented by the chemical formula $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; disulfide compounds; and $Fe_2(MoO_4)_3$, but the present invention is not limited to such materials.

The materials that may be used for the positive electrode current collector is not particularly limited. The positive electrode current collector preferably has a relatively high conductivity without causing a chemical change when used in a battery. For example, stainless steel; aluminum; nickel; titanium; calcined carbon; or a material in which a surface of aluminum or stainless steel is treated with carbon, nickel, titanium, silver, and the like may be used. Preferably, the positive electrode current collector may be aluminum. Adhesion between the current collector and the positive electrode coating mixture desirably may be increased by including fine irregularities on a surface of the current collector interfacing with the coating mixture. Moreover, various structural configurations of the positive electrode current collector may be used, such as a film, a sheet, a foil, a net, a porous body, a foam body, and a non-woven body. The positive electrode current collector generally may have a thickness in a range from 3 μm to 500 μm.

The conductive material in the positive electrode coating mixture generally may be included in an amount from 1 to 50 wt % of the total weight of the mixture including the positive electrode active material. The conductive material is not particularly limited and preferably has conductivity without causing a chemical change when used in a battery. For example, graphite, such as natural graphite and artificial graphite; carbon black, such as carbon black, acetylene black, Ketjen black, channel black, furnace black, lamp black, and summer black; conductive fibers, such as carbon fibers and metal fibers; carbon and metal powders, such as carbon fluoride, aluminum, and nickel powder; conductive whiskeys, such as zinc oxide and potassium titanate; conductive metal oxides, such as titanium oxide; and polyphenylene derivatives, may be used for the conductive material.

The binder in the positive electrode coating mixture assists in bonding between the active material and the conductive material in bonding the coating mixture to the current collector. Such binder is generally included in an amount from 1 to 50% by weight of the total weight of the mixture including the positive electrode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluororubber, and various copolymers.

The filler optionally added to the positive electrode coating mixture may be used as a component to suppress the expansion of the positive electrode. Such a filler is not particularly limited and may include a fibrous material that does not cause a chemical change when used in a battery. For example, olefin polymers, such as polyethylene and a polypropylene, and fibrous materials, such as glass fiber and carbon fiber, may be used.

In some arrangements, the negative electrode may be manufactured by coating, drying, and pressing a negative electrode active material on a negative electrode current collector, and, if necessary, the conductive materials, binders, fillers, and the like discussed above may be optionally further included. In any event, any appropriate materials used in the relevant field may be used, in particular those commonly used for the particular application. For example, as the negative electrode active material, carbon, such as non-graphitizable carbon and graphitic carbon; metal composite oxide represented by the chemical formulas $Li_xFe_2O_3$ ($0 \leq x \leq 1$), $Li_xWO_2$ ($0 \leq x \leq 1$), $Sn_xMe_{1-x}Me'yOz$ (Me: Mn, Fe, Pb, Ge; Me': Al, B, P, Si, elements of groups 1, 2 and 3 of the periodic table, and halogens; $0 < x \leq 1$; $1 \leq y \leq 3$; $1 \leq z \leq 8$); lithium metal; lithium alloys; silicon-based alloys; tin-based alloys; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers, such as polyacetylene; and Li—Co—Ni-based materials may be used.

The materials that may be used for the negative electrode current collector are not particularly limited. The negative electrode current collector preferably has high conductivity without causing a chemical change in the battery. For example, copper; stainless steel; aluminum; nickel; titanium; calcined carbon; a material in which a surface of copper or stainless steel is surface-treated with carbon, nickel, titanium, silver, and the like; and an aluminum-cadmium alloy may be used.

In addition, like the positive electrode current collector, the bond between the negative electrode current collector and the negative electrode active material may be strengthened by forming fine irregularities on the surface of the positive electrode current collector. Various structural configurations of the negative electrode current collector may also be used, such as a film, a sheet, a foil, a net, a porous body, a foam body, a non-woven body, and the like. In addition, the negative electrode current collector may have a thickness generally in a range of 3 μm to 500 μm.

In some arrangements, the separator may be an organic/inorganic complex porous SRS (Safety-Reinforcing Separator). The SRS may have a structure in which a coating layer component including inorganic particles and a binder polymer is coated on a polyolefin-based separator substrate.

Since the SRS does not undergo high-temperature thermal contraction due to the heat resistance of the component inorganic particles, even if the electrode assembly is penetrated by a needle-shaped conductor, an elongated length of the safety separator can be maintained.

The SRS may have a uniform porous structure formed by an interstitial volume between the inorganic particles that are components of the coating layer, in addition to the porous structure of the separator substrate itself. The pores may not only significantly alleviate any external impacts applied to the electrode assembly, but may also facilitate the movement of lithium ions through the pores, as well as enable a large amount of electrolyte to be impregnated into the separator, thereby promoting improved performance of the battery.

In some arrangements, the separator may be dimensioned in its width dimension (orthogonal to the longitudinal dimension in which the separator is unrolled) such that separator portions extend outwardly on both sides beyond corresponding edges of adjacent positive and negative electrodes (hereinafter "surplus portions"). Moreover, such outwardly extending portions of the separator may have a structure including a coating layer thicker than a thickness of the separator formed on one or both sides of the separator in order to prevent shrinkage of the separator. For more information regarding the thicker coating layer on the outwardly extending surplus portions of the separator, see Korean Patent Application Publication No. 10-2016-0054219, the entire contents of which are incorporated herein by reference. In some arrangements, each separator surplus portion may have a size of 5% to 12% of the width of the separator. Moreover, in some arrangements, the coating layer may be coated on both surfaces of the separator over a width of 50% to 90% of the width of each separator surplus portion. In addition, the widths of the coating layers may be the same or different on each surface of the separator. In some arrangements, the coating layer may include inorganic particles and a binder polymer as components.

In exemplary embodiments of the present invention, examples of the polyolefin-based separator component may include high-density polyethylene, linear low-density polyethylene, low-density polyethylene, ultra-high molecular weight polyethylene, polypropylene, or derivatives thereof.

In some arrangements, the thickness of the coating layer may be smaller than the thickness of the first electrode or the second electrode. In some such arrangements, the thickness of the coating layer may be 30% to 99% of the thickness of the first electrode or the second electrode.

In some arrangements, the coating layer may be formed by wet coating or dry coating.

In some arrangements, the polyolefin-based separator substrate and the coating layer may exist in a form in which pores on the surface of the substrate and the coating layer are anchored with each other, whereby the separator substrate and the coating layer may be bonded together firmly.

The substrate and the coating layer of the separator may have a thickness ratio from 9:1 to 1:9. A preferred thickness ratio may be 5:5.

In some arrangements, the inorganic particles may be inorganic particles commonly used in the art. The inorganic particles may interact with each other to form micropores in the form of empty spaces between the inorganic particles while structurally helping to maintain the physical shape of the coating layer. In addition, since the inorganic particles generally have properties that do not change their physical properties even at high temperatures of 200° C. or more, the resultant organic/inorganic complex porous film generally and desirably has excellent heat resistance.

In addition, the materials that may be used for the inorganic particles are not particularly limited but are preferably electrochemically stable. That is, the inorganic particles are preferably selected such that oxidation and/or reduction reactions do not occur in the operating voltage range of the applied battery (for example, 0 to 5 V based on Li/Li+). In particular, the use of inorganic particles having ion transport ability may improve performance by increasing the ionic conductivity in the electrochemical device. Thus, use of inorganic particles having ionic conductivity as high as possible is preferable. In addition, when the inorganic particles have a high density, it is difficult to disperse the inorganic particles during coating, and it can also undesirably increase the weight of the battery. Therefore, use of inorganic particles having density as low as possible is preferable. In addition, inorganic materials having a high dielectric constant contribute to an increase in the degree of dissociation of electrolyte salt, such as a lithium salt, in a liquid electrolyte, thereby improving the ionic conductivity of the electrolyte.

For the above reasons, the inorganic particles may be at least one type selected from the group consisting of inorganic particles having piezoelectricity and inorganic particles having lithium ion transport ability.

Inorganic particles having piezoelectricity refer to materials which are a nonconductor at normal pressure, but have a property of conducting electricity due to a change in the internal structure when a certain pressure is applied. They are also materials which exhibit high permittivity characteristics with a permittivity constant of 100 or more. Inorganic particles having piezoelectricity also generate an electric potential difference between opposing surfaces, e.g., of a separator, by causing one surface to be positively charged and the other surface to be negatively charged, or vice versa, when either tension or compression is applied to an object composed of the inorganic particles, e.g., a separator.

When the inorganic particles having the above characteristics are used as a coating layer component, in the case of an internal short circuit of both electrodes due to an external impact, such as by a needle-shaped conductor, the positive electrode and the negative electrode may not directly contact one another due to the inorganic particles coated on the separator. Moreover, due to the piezoelectricity of the inorganic particles, an electric potential difference may occur within the particles, which desirably may result in electron movement between both electrodes (i.e., the flow of a minute current), so that it may be possible to gently reduce the voltage of the battery, thereby improving safety.

Examples of materials for the inorganic particles having piezoelectricity may be one or more selected from the group consisting of $BaTiO_3$, $Pb(Zr,Ti)O_3$ (PZT), those represented by the chemical formula $Pb_{1-x}La_xZr_{1-y}Ti_yO_3$ (PLZT), $PB(Mg_3Nb_{2/3})O_3$—$PbTiO_3$ (PMN-PT), and hafnia ($HfO_2$), but are not limited to these materials.

Inorganic particles having lithium-ion transport ability refer to inorganic particles containing a lithium element but not storing lithium and instead having a function of moving lithium ions. The inorganic particles having lithium-ion transport ability are capable of transporting and moving lithium ions due to a kind of defect in the particle structure. As a result, the lithium-ion conductivity in the battery may be improved, thereby improving battery performance.

Examples of materials for the inorganic particles having lithium-ion transport ability may be one or more selected from the group consisting of lithium phosphate ($Li_3PO_4$), lithium titanium phosphate (represented by the chemical formula $Li_xTi_y(PO_4)_3$, wherein $0<x<2$, $0<y<3$), lithium aluminum titanium phosphate (represented by the chemical formula $Li_xAl_yTi_z(PO_4)_3$, wherein $0<x<2$, $0<y<1$, $0<z<3$), glass of the series represented by the chemical formula $(LiAlTiP)_xO_y$ ($0<x<4$, $0<y<13$), lithium lanthanum titanate (represented by the chemical formula $Li_xLa_yTiO_3$, wherein $0<x<2$, $0<y<3$), lithium germanium thiophosphate (represented by the chemical formula $Li_xGe_yP_zS_w$, wherein $0<x<4$, $0<y<1$, $0<z<1$, $0<w<5$), lithium nitride (represented by the chemical formula $Li_xNY$, wherein $0<x<4$, $0<y<2$), glass of the $SiS_2$ series (represented by the chemical formula $Li_xSi_yS_z$, wherein $0<x<3$, $0<y<2$, $0<z<4$), and glass of the $P_2S_5$ series (represented by the chemical formula $Li_xP_yS_z$, wherein $0<x<3$, $0<y<3$, $0<z<7$), but are not limited to these materials.

The composition ratio of the inorganic particles and the binder polymer, which are components of the coating layer of the separator, is not particularly limited, but may be adjusted within the range of 10:90 to 99:1 by weight %, and preferably within the range of 80:20 to 99:1 by weight %. When the composition ratio is less than 10:90 by weight %, the content of the polymer may become excessively large, and the pore size and porosity may be reduced due to a decrease in the empty space formed between the inorganic particles, finally resulting in deterioration of the battery performance. On the other hand, when the composition ratio exceeds 99:1 by weight %, the content of the polymer may be too small, and the mechanical properties of the final organic/inorganic composite porous separator may be deteriorated due to weakened adhesive force between the inorganic materials.

In some arrangements, a binder polymer commonly used in the art may be used as the binder polymer.

The coating layer of the organic/inorganic composite porous separator may further include other commonly known additives in addition to the aforementioned inorganic particles and binder polymer.

In some arrangements, the coating layer may be referred to as an active layer.

As discussed above, after the electrode assembly 10 is assembled, a press unit applies heat and pressure to the stack in order to bond the components together before the electrode assembly 10 is further manipulated (e.g., moved to a battery case). Such application of heat and pressure may be accomplished in multiple stages, including an initial primary heat press operation, followed by a secondary heat press operation. To accomplish such heat press operations, press units may be provided like those illustrated in FIGS. 6(a) and 6(b).

Figure 6A:
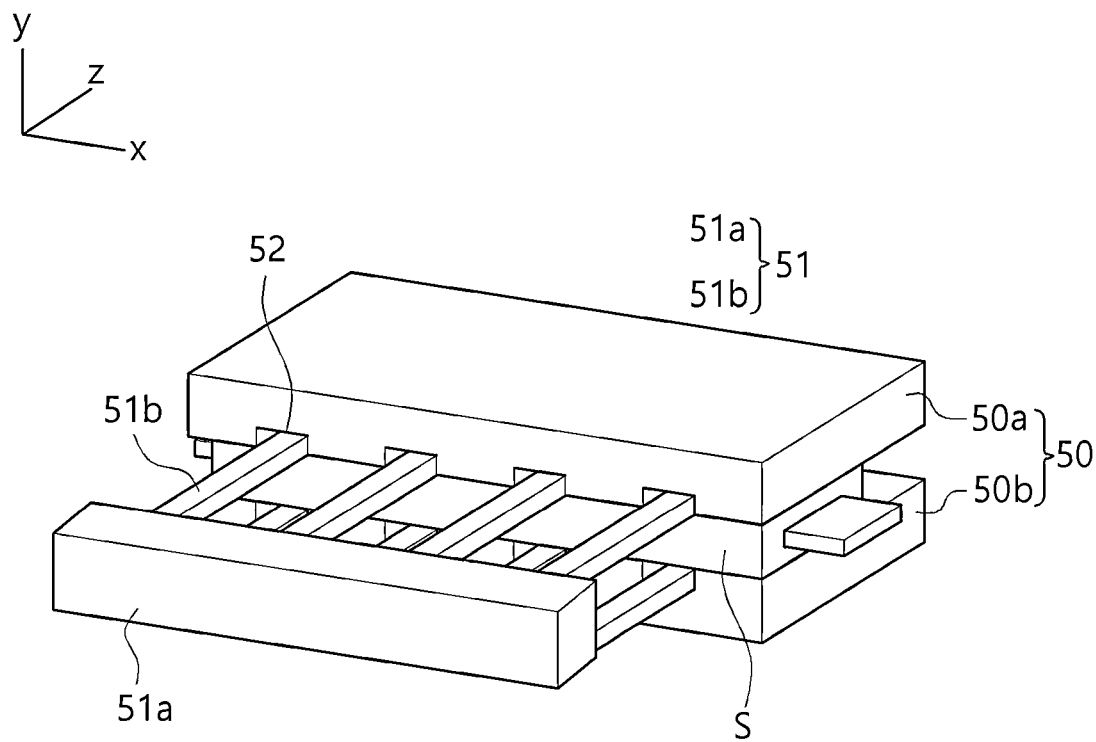
FIG. 6A is a perspective view illustrating a first press unit according to the exemplary embodiment of the present invention.
Figure 6B:
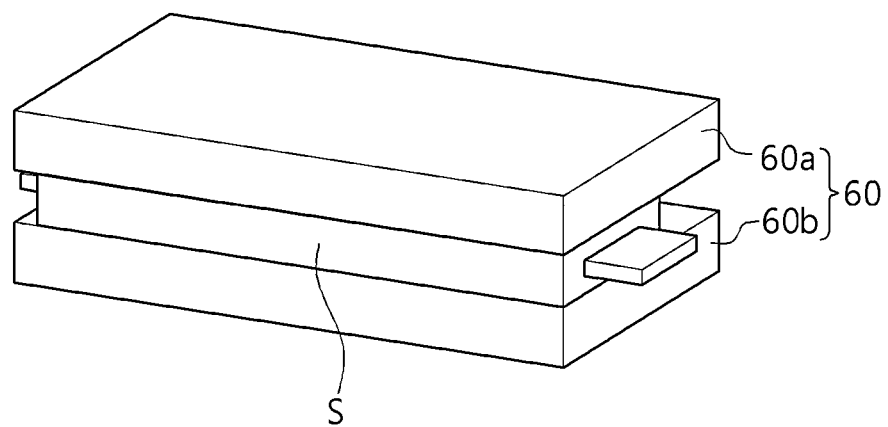
FIG. 6B is a perspective view illustrating a second press unit according to the exemplary embodiment of the present invention.

Referring to FIG. 6(a), the first press unit 50 may primarily heat and press the stack S in a fixed state. The first press unit 50 includes a pair of first pressing blocks 50a and 50b and may further include a gripper 51 capable of fixing the stack S. In fixing the stack S, the gripper 51 may hold the stack S by pressing the upper and lower surfaces of the stack S towards one another along the stacking direction Y to fix the relative positions of the first electrodes 1, the second electrodes 2, and the separator 4.

The pair of first pressing blocks 50a and 50b of the first press unit 50 may move in directions towards and away from each other. In moving towards each other, the pair of first pressing blocks 50a and 50b may compress either one or both of the stack S and the gripper 51.

In this manner, the first press unit 50 may heat and compress the stack S to reduce or eliminate any spaces between the first electrodes 1, the separator 4, and the second electrodes 2 included in the stack S, so as to bond such components of the stack S together.

As shown, each pressing surface of the pair of first pressing blocks 50a and 50b configured for contact with and compression of the stack S may define planes. At least one of the pair of first pressing blocks 50a and 50b may include a gripper groove 52 having a shape corresponding to a fixing part 51b of the gripper 51 described further herein. In the example shown in FIG. 5(a), each of the pair of first pressing blocks 50a and 50b include four gripper grooves 52 to correspond with four fixing parts 51b. However, there may be a greater or fewer number of gripper grooves 52. Preferably, the number of gripper grooves 52 should match the number of fixing parts to be used.

The gripper 51 may include a main body 51a and a plurality of fixing parts 51b. As in the arrangement shown, the main body 51a may have a length along an x axis and a height along a y axis that are the same or approximately the same as the length and height of the stack S along those respective axes. In some other arrangements, the main body may be longer than the length of the stack S in the x axis and have a greater height than the height of the stack S in the y axis. The fixing parts 51b preferably may be in the form of a rod, column, or plate that extend along a width direction (z axis) of the stack S. Here, the length of the stack S in the x axis may refer to the portion of the stack having the longest distance from one end to the other end of the stack S, and the height in the y axis may refer to the distance in the stacking direction of the stack S, and the width in the z axis may refer to a distance in a direction perpendicular to both the x and y axes.

The fixing parts 51b may be provided in two rows in which one row is adjacent to a pressing surface of pressing block 50a while the other row is adjacent to a pressing surface of pressing block 50b. The position of each of the fixing parts 51b may be adjustable in the height direction of the main body 51a. In this manner, each of the fixing parts 51b may be placed in contact with, and preferably along the width of, the upper and lower surfaces of the stack S to fix the position of the stack S and the relative positions of the first electrodes 1 and the second electrodes 2 within the stack S.

In some arrangements, in operation, the first press unit 50 may compress the stack S, e.g. using the pair of pressing blocks 50a and 50b, for a time in a range of 5 seconds to 20 seconds under a temperature condition of 45° C. to 75° C. and under a pressure condition of 1 Mpa to 2.5 Mpa.

In some arrangements, the second press unit 60 may heat and compress the stack S that was previously heated and compressed by the first press unit 50, so as to secondarily compress the already primarily compressed stack S.

As shown in FIG. 5(b), the second press unit 60 includes a pair of second pressing blocks 60a and 60b. The pair of pressing blocks 60a and 60b may be moved in directions towards and away from each other. In moving towards each other, the pair of pressing blocks 60a and 60b may press upon the upper and lowers surfaces of the stack S to compress the stack.

As shown, each pressing surface of the pair of second pressing blocks 60a and 60b configured for contact with and compression of the stack S may define planes. As in the example shown, in some arrangements, grooves for the fixing parts 51b may be excluded from the second pressing blocks 60a and 60b. In some other arrangements, at least one of the pair of second pressing blocks 60a and 60b may include one or more grooves having a shape corresponding to the fixing parts 51b of the gripper 51.

In some arrangements, in operation, the second press unit 60 may compress the stack previously compressed by the first press unit 50 for a time in a range of 5 seconds to 60 seconds under a temperature condition of 50° C. to 90° C. and under a pressure condition of 1 Mpa to 6 Mpa. In some arrangements, the second press unit 60 may heat and press only a portion of the stack S on which the gripper 51 is (or was previously) located, which were not heated and pressed by the first press unit 50. In some other arrangements, the second press unit 50 may heat and press the entire upper and lower surfaces of the stack.

In some arrangements, the first press unit 50 may compress the heated stack S initially, and with the upper surface and the lower surface of the stack S fixed with the gripper 51, to reduce or eliminate any spaces between the first electrodes 1, the separator 4, and the second electrodes 2 included in the stack S, so as to bond such components of the stack S together in the regions of the stack S in which the gripper 51 is not located.

In some such arrangements, the second press unit 60 may compress and heat the stack S which has already been preliminarily bonded by the first press unit 50, and from which the gripper 51 has been removed. The second press unit 60 may thus reduce or eliminate any spaces between the first electrodes 1, the separator 4, and the second electrodes 2 included in the stack S, so as to bond such components of the stack S together in the regions of the stack S in which the gripper 51 previously pressed the stack S during the initial pressing operation by the first press unit 50. In some such arrangements, each of the pair of second pressing blocks 60a and 60b may be a quadrangular block in the form of a rectangular parallelepiped. In such arrangements, the pair of second pressing blocks 60a and 60b may have the flat pressing surfaces described previously herein.

In some arrangements, each of the pair of first pressing blocks 50a and 50b of the first press unit 50 may have the flat pressing surfaces. In some such arrangements, each of the pair of second pressing blocks 60a and 60b of the second press unit 60 may have gripper grooves 52 having a shape corresponding to the fixing parts 51b of the gripper 51.

In some arrangements, the fixing part 51b may include a heat-conducting material, such as a thermally conductive metal material selected from the group consisting of aluminum and iron. By conducting heat to the stack S, when the first press unit 50 compresses the stack S fixed by the gripper 51, the electrodes 1, 2 and separator 4 may be bonded together as the spaces between them are reduced or eliminated.

In some arrangements, the second press unit 60 may not compress regions of the stack S on which the gripper 51 was previously located, but may instead only compress regions of the stack S where the gripper was not previously located and upon which the press unit 50 did not press during the initial pressing.

Further, each of the pair of first pressing blocks 50a and 50b may be a quadrangular block in the form of a rectangular parallelepiped. In such arrangements, the pair of first pressing blocks 50a and 50b may have the flat pressing surfaces described previously herein.

Either one or both of the first and second press units 50 and 60 preferably include a press heater (not illustrated), configured for heating the respective pair of first and second pressing blocks 50a, 50b, 60a, and 60b such that the blocks may heat the stack S when pressing upon the stack. In this manner, when the stack S is pressed with the first and second press units 50 and 60, thermal fusion between the first electrodes 1, the separator 4, and the second electrodes 2 may be better achieved such that a stronger bond may be formed among these layers.

When the stack S is pressed by the heated press unit, an inner side of the outer separator 5 surrounding the outermost portion of the stack S may be bonded to the adjacent portions of serpentine separator 4 (i.e., folded portions P), as well as to the lateral ends 6 of the first and second electrodes 1, 2 in the lateral dimension Z that are exposed to the adjacent outer separator 5 by the open regions characterized by the absence of folded portions P.

Accordingly, by bonding the components of the electrode assembly 10 together in this way, unfolding of the stack S may be prevented and battery stability may be improved. In addition, there may be no need for a separate adhesive tape or tool for preventing the unfolding of the stack S, which may shorten manufacturing time and lead to increased process efficiency.

At least one outer surface of the stack S according to the present invention may include two or more patterns having different properties or heights from those of the other regions on that surface.

Figure 4:
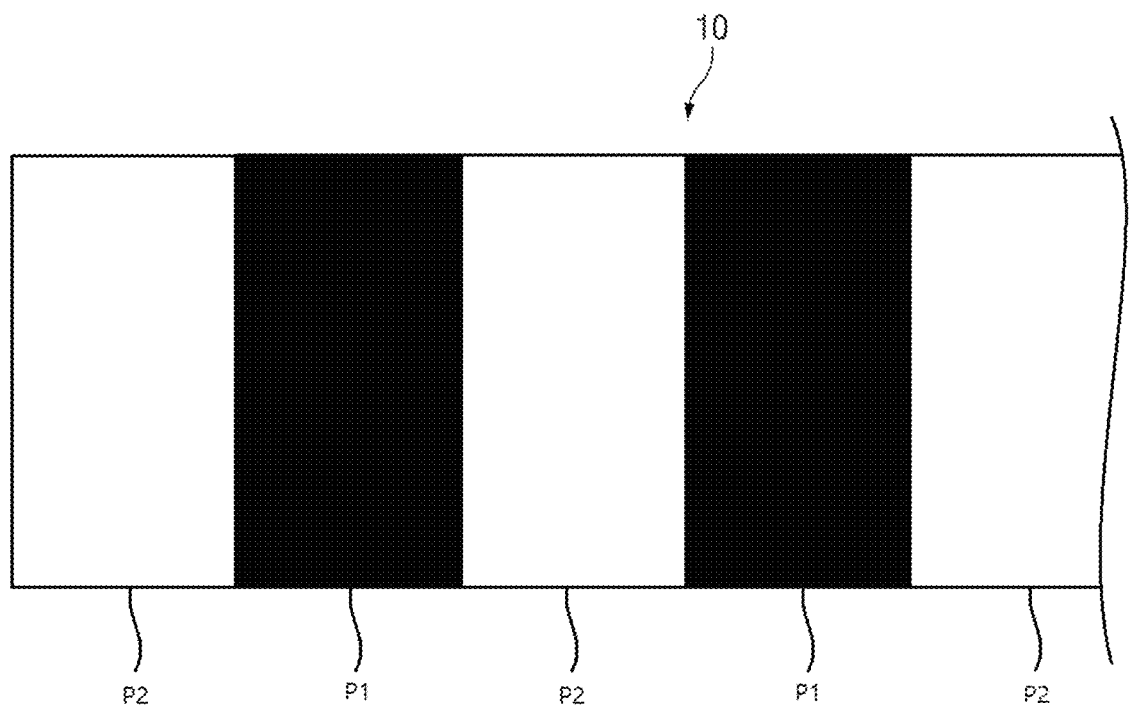
FIG. 4 is a top plan view illustrating an electrode assembly including first and second regions according to an exemplary embodiment of the present invention.
Figure 5:
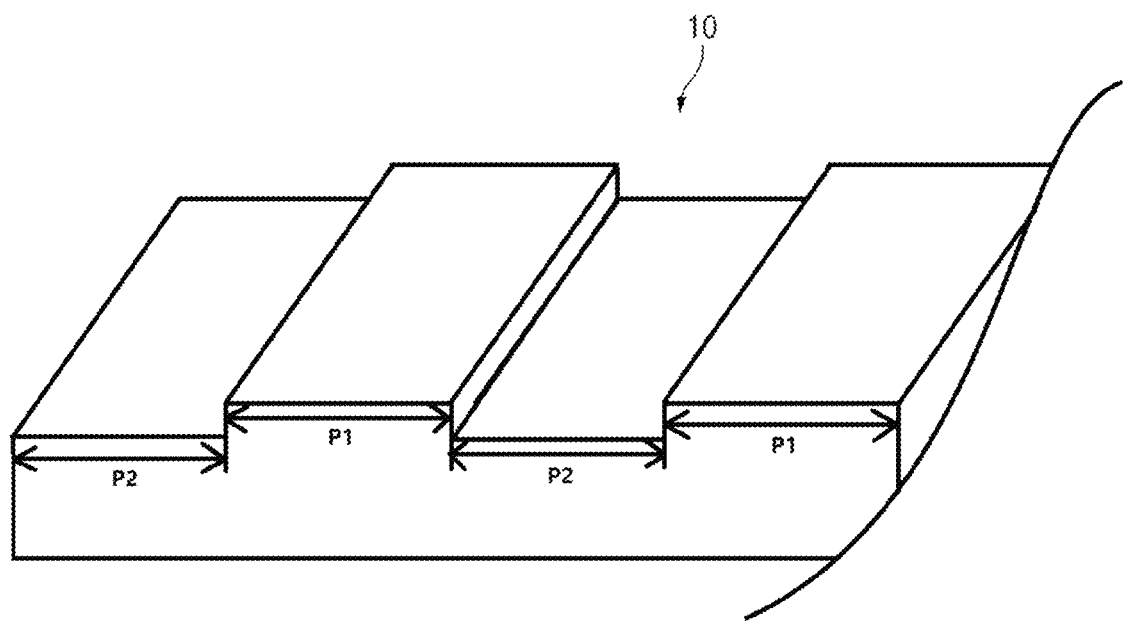
FIG. 5 is a perspective view illustrating an electrode assembly including first and second regions according to another exemplary embodiment of the present invention.

In the exemplary embodiment, and with reference to FIG. 4 and FIG. 5, a surface of the stack S may include a first region P1 and a second region P2 having different properties or heights on that surface. For example, the first region P1 may be a region that was engaged by a gripper (e.g., gripper 51, and specifically fixing parts 51b of the gripper), whereas the second region P2 may be a region that was not engaged by the gripper. Accordingly, the width of the first region P1 may correspond to the width of the gripper, and specifically the width of the fixing parts 51b of the gripper.

The first region P1 and the second region P2 may appear when the stack S is pressed by the gripper in the process operation described above.

The separator 4 included in the stack S of the electrode assembly may have almost no binder component, so the adhesive force may be low. Therefore, when the stack S is pressed, the first electrode 1 and the second electrode 2 may become distorted by the pressure applied to the stack S.

Therefore, the electrode assembly 10 according to the present invention may be manufactured by performing a primary heat press operation, which includes engaging the upper surface and the lower surface of the stack S with the gripper (in order to secure the components of the stack S) and then performing a secondary heat press operation after the gripper is removed.

As a result, the first region P1 and the second region P2 may differ in at least one of properties and heights. In one example, the property may be a shade or color of at least one surface of the stack. In another example, the property may be air permeability of the separator 4 or adhesive force between the electrodes and the separator. Adhesive force may refer to the amount of force required to peel the separator 4 away from the electrodes 1, 2.

Two or more first regions P1 and two or more second regions P2 may be included. In addition, the plurality of first regions P1 may be spaced apart from each other, and the plurality of second regions P2 may also be spaced apart from each other.

In the exemplary embodiment, the number of first regions P1 may be less than the number of second regions P2. For example, when the number of first regions P1 in the electrode assembly 10 is N (N is a positive integer excluding 0), the number of second regions P2 may be N+1.

The first region P1 and the second region P2 may be alternately positioned with respect to one another along a width direction X of the electrode assembly 10 or the stack S. In addition, at least one boundary of the first area P1 may be in contact with at least one boundary of the second area P2.

In the electrode assembly 10 according to the present invention, the portions of the upper and/or lower surfaces of the stack S that the gripper 51 (and specifically the fixing parts 51b of the gripper) engaged may have a darker shade than the portions that were not engaged by the gripper 51 during the heat press operation with the first press unit 50. In the exemplary embodiment, the portion that was engaged by the fixing parts 51b of the gripper 51 is the first region P1, whereas the portion that was not engaged by the fixing parts 51b of the gripper 51 is the second region P2.

In addition, or alternatively, the electrode assembly 10 according to the present invention may include a step difference between the first region P1 and the second region P2. In other words, the height of the portions of the upper and/or lower surfaces of the stack S that the gripper 51 (and specifically the fixing parts 51b of the gripper) engaged may have a different height than the portions of the upper and/or lower surfaces of the stack S that were not engaged by the fixing parts 51b of the gripper 51. When the portion engaged by the gripper is the first region P1 and the portion not engaged by the gripper is the second region P2, the surface of the electrode assembly 10 may include a surface step, and the first region P1 may be higher than the second region P2.

In the electrode assembly 10, the width of the first region P1 may be smaller than the width of the second region P2.

In other words, when it is assumed that the total area of one surface of the stack S including the first region P1 and the second region P2 is 100%, the area of the first region P1 may be 30% to 50% of the area of one surface.

In the electrode assembly 10 according to the present invention, it is possible to minimize the property or height deviation between the first region P1 and the second region P2 by minimizing the width of the components of the gripper 51 that engage the electrode assembly 10. When the property or height deviation between the first region P1 and the second region P2 is minimized, the overall properties or height of the electrode assembly 10 may be more uniform.

Further, when the area of the first region P1 is less than 30% of the area of one surface of the stack S, it is more likely that the electrodes of the electrode assembly 10 will shift prior to being secured by bonding. Thus, as a result, the energy density of the electrode assembly will be lowered. On the other hand, when the area of the first region P1 exceeds 50% of the area of one surface of the stack S, it may result in the problem that the bonding of the components within the stack S will not achieve a minimum desirable amount of adhesive force.

Further, the surface provided with the pattern may be the upper surface, the lower surface, or both the upper surface and the lower surface of the stack S at opposite ends of the stack S in the stacking direction.

As used herein, "adhesive force" refers to the adhesive force between the first electrode 1 and the separator or between the second electrode 2 and the separator. In accordance with the present invention, a method for measuring adhesive force of the separator is not particularly limited. In accordance with one measurement method, samples having a width of 55 mm and a length of 20 mm are each adhered to a respective slide glass with the electrode being positioned on the adhesive surface of the slide glass. The samples are then each tested by performing a 90° peel test at a speed of 100 mm/min pursuant to the testing method set forth in ASTM-D6862. That is, an edge of the separator is pulled upwardly at 90° relative to the slide glass at a speed of 100 mm/min so as to peel the separator away from the electrode along the width direction of the sample (i.e., peeling from 0 mm to 55 mm). Utilizing such testing method, the adhesive force between the electrodes and the separator in the first region P1 (hereinafter, the adhesive force of the first region P1) may be 3 gf/20 mm to 25 gf/20 mm, and the adhesive force between the electrodes and the separator in the second region P2 (hereinafter, the adhesive force of the second region P2) may be 4 gf/20 mm to 30 gf/20 mm.

A difference in adhesive force between the separator 4 and the electrodes 1, 2 in the first region P1 and the second region P2 may be from 0.1 gf/20 mm to 11 gf/20 mm.

According to exemplary embodiments of the present invention, and with reference to FIG. 2, the middle adhesive force (i.e., the adhesive force in region 1) of the electrode assembly first region P1 may be in a range from 3 gf/20 mm to 10 gf/20 mm, preferably from 5 gf/20 mm to 6 gf/20 mm.

According to exemplary embodiments of the present invention, the upper surface adhesive force (i.e., the adhesive force in region 1 of FIG. 2) of the electrode assembly first region P1 may be in a range from 8 gf/20 mm to 20 gf/20 mm, preferably from 9 gf/20 mm to 14 gf/20 mm.

According to exemplary embodiments of the present invention, the lower surface adhesive force (i.e., the adhesive force in region 3 of FIG. 2) of the electrode assembly first region P1 may be in a range from 9 gf/20 mm to 25 gf/20 mm, preferably from 9 gf/20 mm to 12 gf/20 mm.

According to exemplary embodiments of the present invention, the middle adhesive force of the electrode assembly second region P2 may be in a range from 4 gf/20 mm to 15 gf/20 mm, preferably from 5 gf/20 mm to 11 gf/20 mm.

According to exemplary embodiments of the present invention, the upper surface adhesive force of the electrode assembly second region P2 may be in a range from 5 gf/20 mm to 25 gf/20 mm, preferably from 7 gf/20 mm to 21 gf/20 mm.

According to exemplary embodiments of the present invention, the lower surface adhesive force of the electrode assembly second region P2 may be in a range from 7 gf/20 mm to 30 gf/20 mm, preferably from 10 gf/20 mm to 22 gf/20 mm.

According to exemplary embodiments of the present invention, the adhesive force between the positive electrode and the separator and the adhesive force between the negative electrode and the separator may be the same or different from each other.

When the adhesive force of the first region P1 and the second region P2 is less than 4 gf/20 mm, the adhesive force of the electrode assembly 10 may be low, such that there may occur the problem that the folding of the separator 4 becomes released and/or the electrode assembly 10 falls apart when it is moved during the manufacturing process.

When the adhesive force of the first region P1 exceeds 15 gf/20 mm and the adhesive force of the second region P2 exceeds 26 gf/20 mm, air permeability and electrolyte wetting ability of the separator 4 may be reduced, such that it is difficult for the electrolyte to penetrate into the electrode assembly 10, thereby decreasing the initial capacity and increasing the initial resistance of the electrode assembly 10.

In the present invention, the "air permeability" of the electrode assembly means the air permeability of the separator 4 of the electrode assembly 10.

In the present invention, the method for measuring the air permeability of the separator is not particularly limited. In the method utilized and discussed further herein, the air permeability was measured by using a method commonly used in the art, namely, according to the JIS Gurley measurement method of the Japanese industrial standard using a Gurley type Densometer (No. 158) manufactured by Toyo-seiki. That is, the air permeability of the separator was obtained by measuring the time it takes for 100 ml (or 100 cc) of air to pass through the separator of 1 square inch under a pressure of 0.05 MPa at room temperature (i.e., 20° C. to 25° C.).

In addition, unless specifically stated, "air permeability" refers to air permeability of all separators in the electrode assembly, where the air permeability of each separator may be independently the same or different. In addition, as described above, the upper surface air permeability, the lower surface air permeability, and the middle air permeability may be defined according to the position of the electrode assembly.

A difference in air permeability between the first region P1 and the second region P2 may be 2 sec/100 ml to 25 sec/100 ml.

According to exemplary embodiments of the present invention, the middle air permeability of the electrode assembly first region P1 may be in a range from 70 sec/100 ml to 90 sec/100 ml, preferably from 75 sec/100 ml to 86 sec/100 ml.

According to exemplary embodiments of the present invention, the upper surface air permeability of the electrode assembly first region P1 may be in a range from 80 sec/100 ml to 110 sec/100 ml, preferably from 80 sec/100 ml to 98 sec/100 ml.

According to exemplary embodiments of the present invention, the lower surface air permeability of the electrode assembly first region P1 may be in a range from 80 sec/100 ml to 110 sec/100 ml, preferably from 80 sec/100 ml to 98 sec/100 ml.

According to exemplary embodiments of the present invention, the middle air permeability of the electrode assembly second region P2 may be in a range from 70 sec/100 ml to 100 sec/100 ml, preferably from 75 sec/100 ml to 84 sec/100 ml.

According to exemplary embodiments of the present invention, the upper surface air permeability of the electrode assembly second region P2 may be in a range from 80 sec/100 ml to 110 sec/100 ml, preferably from 84 sec/100 ml to 101 sec/100 ml.

According to exemplary embodiments of the present invention, the lower surface air permeability of the electrode assembly second region P2 may be in a range from 80 sec/100 ml to 110 sec/100 ml, preferably from 84 sec/100 ml to 101 sec/100 ml.

According to exemplary embodiments of the present invention, the lower surface air permeability may be less than or equal to the upper surface air permeability. In addition, the middle air permeability may be less than or equal to the lower surface air permeability. That is, the magnitude of the upper surface air permeability, the lower surface air permeability, and the middle air permeability may satisfy Equation 1 below.

Upper surface air permeability≥Lower surface air permeability≥Middle air permeability    [Equation 1]

The values of air permeability in Equation 1 relate to the air permeability of the separators in the electrode assembly after the completion of the heating and pressing steps.

According to exemplary embodiments of the present invention, when the air permeability of the separator 4 in the first region P1 and the second region P2 is less than 70 sec/100 ml, the electrolyte wetting ability property of the electrolyte may be low, such that the movement path of ions is blocked, thereby reducing the performance of the electrode assembly 10. On the other hand, when the air permeability of the separator 4 in the first region P1 and the second region P2 exceeds 110 sec/100 ml, the adhesive force between the electrodes and the separator is reduced, thus leading to shifting of those components within the electrode assembly.

1) Example 1

19 positive electrode sheets, 20 negative electrode sheets, and an elongated separator were stacked in a stack S on a stack table.

More specifically, the positive electrode and the negative electrode were supplied after being cut from a positive electrode sheet and a negative electrode sheet, respectively, and the separator was supplied in the form of an elongated separator sheet. Thereafter, the supplied separator was folded while rotating the stack table, and the positive electrode, the negative electrode, and the separator were thus stacked. In this case, the stacking was carried out while using a gripper to press an upper surface of the stack S downwardly towards the stack table, so as to fix the location of the stack S with respect to the stack table.

After manufacturing the stack, the stack was gripped with the gripper 51 and a primary heat press operation was performed, involving pressing the stack in first press unit 50 for 15 seconds while heating the stack under a temperature condition of 70° C. and under a pressure condition of 1.91 MPa.

After the primary heat press operation, the gripper 51 was released from the stack S and the secondary heat press operation in which the second press unit 60 was heated to a temperature of 70° C. (temperature condition), and a pressure of 2.71 Mpa (pressure condition) was applied to the stack with a pressing block of the second press unit 60 for 10 seconds (press time), thus resulting in the electrode assembly of Example 1.

In the process of manufacturing the electrode assembly, the above-described disclosure of the present invention may be applied.

2) Examples 2 to 12

Electrode assemblies of Examples 2 to 12 were manufactured in the same manner as in Example 1, except that the secondary heat press operation was performed under the temperature conditions, pressure conditions, and press time represented in Table 1 below. That is, the primary heat press conditions of Examples 1 to 12 are the same.

TABLE 1

| | Primary heat press | | | |
| --- | --- | --- | --- | --- |
| | Temperature condition | Pressure condition Press area (314.57 cm$^2$) | | Press time |
| | (° C.) | Tonf | MPa | (s) |
| Example 1 | 70 | 6 | 1.91 | 15 |
| Example 2 | | | | |
| Example 3 | | | | |
| Example 4 | | | | |
| Example 5 | | | | |
| Example 6 | | | | |
| Example 7 | | | | |
| Example 8 | | | | |
| Example 9 | | | | |
| Example 10 | | | | |
| Example 11 | | | | |
| Example 12 | | | | |

| | Secondary heat press | | | |
| --- | --- | --- | --- | --- |
| | Temperature condition | Pressure condition Press area (554.1 cm$^2$) | | Press time |
| | (° C.) | Tonf | MPa | (s) |
| Example 1 | 70 | 5 | 2.71 | 10 |
| Example 2 | 70 | 5 | 2.71 | 20 |
| Examples 3 | 70 | 4 | 2.17 | 10 |
| Example 4 | 70 | 4 | 2.17 | 20 |
| Example 5 | 60 | 4 | 2.17 | 10 |
| Example 6 | 60 | 4 | 2.17 | 20 |
| Example 7 | 60 | 5 | 2.71 | 10 |
| Example 8 | 60 | 5 | 2.71 | 20 |
| Example 9 | 80 | 4 | 2.17 | 10 |
| Example 10 | 80 | 4 | 2.17 | 20 |
| Example 11 | 80 | 5 | 2.71 | 10 |
| Example 12 | 80 | 5 | 2.71 | 20 |

3) Comparative Examples 1 to 5

Electrode assemblies of Comparative Examples 1 to 5 were manufactured in the same manner as in Example 1, except that the primary heat press operation was performed under the temperature conditions, pressure conditions, and press time represented in Table 2 below in Example 1, and the secondary heat press operation was not performed.

TABLE 2

Primary heat press

| | Temperature condition (° C.) | Pressure condition Press area (314.57 cm$^2$) | | Press time (s) |
|---|---|---|---|---|
| | | Tonf | MPa | |
| Comparative Example 1 | 70 | 6 | 1.91 | 8 |
| Comparative Example 2 | 80 | 6 | 1.91 | 8 |
| Comparative Example 3 | 90 | 4 | 1.27 | 8 |
| Comparative Example 4 | 90 | 4 | 1.27 | 15 |
| Comparative Example 5 | 90 | 6 | 1.91 | 8 |
| Comparative Example 6 | 90 | 8 | 2.54 | 8 |
| Comparative Example 7 | 90 | 8 | 2.54 | 15 |

Secondary heat press (not performed)

| | Temperature condition (° C.) | Pressure condition Press area (554.1 cm$^2$) | | Press time (s) |
|---|---|---|---|---|
| | | Tonf | MPa | |
| Comparative Example 1 | — | — | — | — |
| Comparative Example 2 | — | — | — | — |
| Comparative Example 3 | — | — | — | — |
| Comparative Example 4 | — | — | — | — |
| Comparative Example 5 | — | — | — | — |
| Comparative Example 6 | — | — | — | — |
| Comparative Example 7 | — | — | — | — |

All of the electrode assemblies of Examples 1 to 12 and Comparative Examples 1 to 5 manufactured under the conditions of Tables 1 and 2 were tested by picking each of them up with a vacuum suction mechanism. In all the electrode assemblies of Comparative Examples 1 to 5, it was observed that the electrodes and separator became separated before 60 seconds.

That means that the electrode assemblies of Comparative Examples 1 to 5 had poor adhesion between the electrode and the separator, whereas the electrode assembly according to the present application (which was subjected to the primary and the secondary press operations), had a good adhesion state, and thus had the excellent effect of resisting any unfolding and falling apart of the electrode assembly.

In the case of Comparative Examples 6 and 7, although the electrodes and separator were not observed to separate before 60 seconds, it was confirmed that damage to the electrode assembly occurred. This is believed to have occurred because the first press was performed under a pressure condition of 2.54 Mpa (high pressure).

4) Experimental Example 1—Adhesive Force Evaluation and Withstand Voltage Evaluation Adhesive forces between surfaces at the upper end, the lower end, and the middle of the stack S were measured by disassembling (i.e., separating the layers of) the electrode assemblies of Examples 1 to 12 and Comparative Examples 6 and 7 (in which the separation of the electrodes and separator were not observed before 60 seconds in the previous test) and then analyzing the separated layers. Specifically, adhesive force between the negative electrode and the separator located at the lowermost end of the stack was measured. Additionally, adhesive force between the negative electrode and the separator located at the uppermost end of the stack was measured. Finally, adhesive force between the negative electrode and the separator located at a middle location along the stacking direction of the stack was measured.

In each of the separated electrode assemblies, the negative electrode and the separator sampled had a width of 55 mm and a length of 20 mm. The sampled sample was adhered to the slide glass with the electrode being positioned on the adhesive surface of the slide glass. After that, the slide glass with the sample was mounted on the adhesive force measuring device and tested by performing 90° peel test at a speed of 100 mm/min pursuant to the testing method set forth in ASTM-D6862, as discussed above. After discounting any initial significant fluctuations, the values for applied force per sample width (in grams/mm) were measured while the separator was peeled away from the electrode.

The results are represented in Table 3 below.

TABLE 3

| | Negative electrode adhesive force | | | |
|---|---|---|---|---|
| | Upper surface | Middle | Lower surface | deviation |
| Example 1 | 19.8 | 10.8 | 21.5 | 10.7 |
| Example 2 | 20.3 | 9.7 | 19.5 | 10.6 |
| Example 3 | 9.9 | 5.2 | 11.4 | 6.2 |
| Example 4 | 16.6 | 9.2 | 17 | 7.8 |
| Example 5 | 9.4 | 4.0 | 9.9 | 5.9 |
| Example 6 | 11.1 | 7.1 | 14.3 | 7.2 |
| Example 7 | 7.9 | 6.2 | 10.5 | 4.3 |
| Example 8 | 13.4 | 8.9 | 18 | 9.1 |
| Example 9 | 14 | 5.2 | 10.4 | 8.8 |
| Example 10 | 14.2 | 7.9 | 14.6 | 6.7 |
| Example 11 | 16.7 | 7.2 | 18.5 | 11.3 |
| Example 12 | 25.3 | 12.0 | 22.4 | 13.3 |
| Comparative Example 6 | 15.6 | 7.2 | 25.9 | 18.7 |
| Comparative Example 7 | 30.7 | 12.6 | 25.1 | 18.1 |

In addition, the withstand voltages of the electrode assemblies of Examples 1, 6 and 12 and Comparative Examples 1 to 7 were also measured.

The results are represented in Table 4 below.

TABLE 4

| | Withstand voltage (kV) |
|---|---|
| Example 1 | 1.58 |
| Example 6 | 1.56 |
| Example 12 | 1.58 |
| Comparative Example 1 | 1.82 |
| Comparative Example 2 | 1.51 |
| Comparative Example 3 | 1.49 |
| Comparative Example 4 | 1.47 |
| Comparative Example 5 | 1.48 |
| Comparative Example 6 | 1.45 |
| Comparative Example 7 | 1.45 |

Investigating the results of Table 4, it was confirmed that the adhesive force of Examples 1 to 3 was superior to that of Comparative Example 1, in which only the primary heat press operation was performed under conditions similar to those of the Examples.

In addition, investigating the results of Table 6, it was confirmed that the withstand voltage of Examples 1 to 3, in which the primary heat press operation was performed under higher temperature and higher pressure conditions than those of the Comparative Examples had a range of 1.56 kV or more and 1.8 kV or less.

That is, the electrode assembly of the present invention has excellent adhesive force and at the same time, has a withstand voltage suitable for use as an electrode assembly. In that regard, a withstand voltage of 1.8 kV or less was confirmed.

It is believed that this is because the electrode assembly was manufactured by the manufacturing method including both the primary and secondary heat press.

5) Experimental Example 2—Evaluation of Air Permeability

Among Examples 1 to 12, the air permeability of the electrode assemblies of Examples 1, 6, and 12, which differed only in the temperature condition of the secondary press, was evaluated.

Specifically, after collecting the separators in the electrode assemblies of Examples 1, 6, and 12, the separators were cut to prepare separator samples having a size of 5 cm×5 cm (width×length). After that, the separator samples were washed with acetone.

Air permeability of Examples 1, 6, and 12 were measured by measuring the time it took for 100 ml (or 100 cc) of air to pass through the separator of 1 square inch at room temperature and under the pressure condition of 0.05 MPa by using a Gurley type Densometer (No. 158) from Toyo-seiki in accordance with the JIS Gurley measurement method of the Japanese industrial standard.

The results are represented in Table 5.

TABLE 5

| | Air permeability | | | |
| --- | --- | --- | --- | --- |
| | Upper surface | Middle | Lower surface | Deviation |
| Example 1 | 88 | 76 | 84 | 11.1 |
| Example 6 | 88 | 75 | 87 | 12.3 |
| Example 12 | 101 | 84 | 100 | 17.4 |
| Comparative Example 1 | 76 | 74 | 77 | 3.0 |

From the results of Table 5, when the condition of the secondary heat press operation according to the present invention is satisfied, it was confirmed that the air permeability corresponding to each location was less than 120 sec/100 ml, although they had an appropriate level of air permeability for use as an electrode assembly. It was also confirmed that the deviations in air permeability between each location were also less than 20 sec/100 ml, which was considered to be substantially uniform. That is, it was confirmed once again that the electrode assembly manufactured by the manufacturing method according to the present invention had uniform performance.

In addition, it was confirmed that the air permeability deviation between to each location was less than 20 sec/100 ml, which was considered to be substantially uniform.

Among them, it was confirmed that the air permeability deviation was the smallest in the case of Example 1 with the temperature condition of 70° C.

Through the above experimental examples, it was confirmed that the electrode assembly according to the present invention had proper and uniform air permeability and adhesive force.

On the other hand, in the case of Comparative Example 1, the deviation in air permeability between each location was smaller than that of the Example, but it could be confirmed that the upper surface air permeability and the lower surface air permeability were each independently less than 80 sec/100 ml, so that safety was lower than that of the electrode assembly according to the present invention. It is believed that this is because only the primary heat press operation was performed.

What is claimed is:

1. An electrode assembly, comprising:
a plurality of electrodes arranged in a stack along a stacking axis, wherein each of the electrodes in the stack is separated along the stacking axis from a successive one of the electrodes in the stack by a respective separator portion positioned therebetween,
wherein at least one outer surface of the stack includes a pattern defining two or more first regions and two or more second regions, the first regions being spaced apart from each other and the second regions being spaced apart from each other, wherein a second portion of the stack corresponding to the second regions has a different property from a first portion of the stack corresponding to the first regions, the at least one outer surface of the stack that includes the pattern being an upper surface, a lower surface, or both the upper surface and the lower surface of the stack,
wherein the property is adhesive force between the electrodes and separator portions in the first and second regions, and optionally includes any one of shading or color of the at least one outer surface of the stack or air permeability of the separator portions in the first and second regions,
wherein the adhesive force between the electrodes and the respective separator portions in the first regions is in a range from 3 gf to 25 gf per 20 mm width of the respective separator portion, and the adhesive force between the electrodes and the respective separator portions in the second regions is in a range from 4 gf to 30 gf per 20 mm width of the respective separator portion, and
wherein the adhesive force in the first portion corresponding to the first regions is different than the adhesive force in the second portion corresponding to the second regions, the difference in adhesive force between the first and second portions being in a range from 0.1 gf to 11 gf per 20 mm width of the respective separator portion.

2. The electrode assembly of claim 1, wherein the first regions and the second regions are alternately positioned with one another along a width direction of the stack, the width direction being transverse to the stacking axis.

3. The electrode assembly of claim 1, wherein the first regions have a smaller width than a width of the second regions.

4. The electrode assembly of claim 1, wherein a quantity of the first regions is less than a quantity of the second regions.

5. The electrode assembly of claim 1, wherein the adhesive force between the electrodes and the respective separator portions is defined by a peel force applied to an edge of the respective one of the separator portions in order to peel, at a speed of 100 mm/min along the stacking axis, the respective one of the separator portions away from a respective one of the electrodes to which it is adhered.

6. The electrode assembly of claim 1, wherein the air permeability of the separator portions has a value in seconds per 100 ml per square inch of the respective separator portion at a pressure of 0.05 MPa, and wherein the value of the air permeability of the separator portions in the first portion corresponding to the first regions is different than the value of the air permeability of the separator portions in the second portion corresponding to the second regions, the difference in the values of the air permeability between the first and second portions being in a range from 2 sec/100 ml to 25 sec/100 ml.

7. The electrode assembly of claim 1, wherein the separator portions are portions of an elongated separator sheet, the elongated separator being folded between each separator portion such that the elongated separator sheet follows a serpentine path traversing back and forth along an orthogonal dimension orthogonal to the stacking axis to extend between each of the successive electrodes in the stack, and wherein each of the electrodes in the stack has a first lateral end and a second lateral end on opposite sides of the respective electrode in the orthogonal dimension.

8. The electrode assembly of claim 7, wherein the stack further includes an outer separator encircling a perimeter of the stack.

9. The electrode assembly of claim 8, wherein the outer separator is an integral portion of the elongated separator sheet.

10. The electrode assembly of claim 8, wherein an inner side of the outer separator is thermally bonded to at least one of a folded portion of the elongated separator or the first or second lateral ends of at least one of the electrodes in the stack.

11. The electrode assembly of claim 1, wherein each of the electrodes in the stack are thermally bonded to an adjacent one of the separator portions.

12. An electrode assembly, comprising:
a plurality of electrodes arranged in a stack along a stacking axis, wherein each of the electrodes in the stack is separated along the stacking axis from a successive one of the electrodes in the stack by a respective separator portion positioned therebetween,
wherein at least one outer surface of the stack includes a pattern defining a first region and a plurality of second regions, wherein a quantity of the first regions is less than a quantity of the second regions, wherein a second portion of the stack corresponding to the second regions has a different property from a first portion of the stack corresponding to the first regions, the at least one outer surface of the stack that includes the pattern being an upper surface, a lower surface, or both the upper surface and the lower surface of the stack,
wherein the property is adhesive force between the electrodes and separator portions in the first and second regions, and optionally includes any one of shading or color of the at least one outer surface of the stack or air permeability of the separator portions in the first and second regions,
wherein the adhesive force between the electrodes and the respective separator portions in the first regions is in a range from 3 gf to 25 gf per 20 mm width of the respective separator portion, and the adhesive force between the electrodes and the respective separator portions in the second regions is in a range from 4 gf to 30 gf per 20 mm width of the respective separator portion, and
wherein the adhesive force in the first portion corresponding to the first regions is different than the adhesive force in the second portion corresponding to the second regions, the difference in adhesive force between the first and second portions being in a range from 0.1 gf to 11 gf per 20 mm width of the respective separator portion.

13. The electrode assembly of claim 12, wherein the first regions and the second regions are alternately positioned with one another along a width direction of the stack, the width direction being transverse to the stacking axis.

14. The electrode assembly of claim 12, wherein the first regions have a smaller width than a width of the second regions.

15. The electrode assembly of claim 12, wherein the adhesive force between the electrodes and the respective separator portions is defined by a peel force applied to an edge of the respective one of the separator portions in order to peel, at a speed of 100 mm/min along the stacking axis, the respective one of the separator portions away from a respective one of the electrodes to which it is adhered.

16. The electrode assembly of claim 12, wherein the air permeability of the separator portions has a value in seconds per 100 ml per square inch of the respective separator portion at a pressure of 0.05 MPa, and wherein the value of the air permeability of the separator portions in the first portion corresponding to the first regions is different than the value of the air permeability of the separator portions in the second portion corresponding to the second regions, the difference in the values of the air permeability between the first and second portions being in a range from 2 sec/100 ml to 25 sec/100 ml.

17. The electrode assembly of claim 12, wherein the separator portions are portions of an elongated separator sheet, the elongated separator being folded between each separator portion such that the elongated separator sheet follows a serpentine path traversing back and forth along an orthogonal dimension orthogonal to the stacking axis to extend between each of the successive electrodes in the stack, and wherein each of the electrodes in the stack has a first lateral end and a second lateral end on opposite sides of the respective electrode in the orthogonal dimension.

18. The electrode assembly of claim 17, wherein the stack further includes an outer separator encircling a perimeter of the stack.

19. The electrode assembly of claim 18, wherein the outer separator is an integral portion of the elongated separator sheet, and wherein an inner side of the outer separator is thermally bonded to at least one of a folded portion of the elongated separator or the first or second lateral ends of at least one of the electrodes in the stack.

20. The electrode assembly of claim 12, wherein each of the electrodes in the stack are thermally bonded to an adjacent one of the separator portions.

21. The electrode assembly of claim 12, wherein the first regions are spaced apart from each other and the second regions are spaced apart from each other.

22. An electrode assembly, comprising:
a plurality of electrodes arranged in a stack along a stacking axis, wherein each of the electrodes in the stack is separated along the stacking axis from a successive one of the electrodes in the stack by a respective separator portion positioned therebetween, wherein at least one outer surface of the stack includes a repeating pattern defining two or more first regions and two or more second regions, wherein a second portion of the stack corresponding to the second regions has a different property from a first portion of the stack corresponding to the first regions, the at least one outer surface of the stack that includes the pattern being an upper surface, a lower surface, or both the upper surface and the lower surface of the stack, wherein the property is adhesive force between the electrodes and separator portions in the first and second regions, and optionally includes any one of shading or color of the at least one outer surface of the stack or air permeability of the separator portions in the first and second regions, wherein the adhesive force between the electrodes and the respective separator portions in the first regions is in a range from 3 gf to 25 gf per 20 mm width of the respective separator portion, and the adhesive force between the electrodes and the respective separator portions in the second regions is in a range from 4 gf to 30 gf per 20 mm width of the respective separator portion, and wherein the adhesive force in the first portion corresponding to the first regions is different than the adhesive force in the second portion corresponding to the second regions, the difference in adhesive force between the first and second portions being in a range from 0.1 gf to 11 gf per 20 mm width of the respective separator portion.

23. The electrode assembly of claim 22, wherein the first regions and the second regions are alternately positioned with one another along a width direction of the stack, the width direction being transverse to the stacking axis.

24. The electrode assembly of claim 22, wherein the first regions have a smaller width than a width of the second regions.

25. The electrode assembly of claim 22, wherein a quantity of the first regions is less than a quantity of the second regions.

26. The electrode assembly of claim 22, wherein the adhesive force between the electrodes and the respective separator portions is defined by a peel force applied to an edge of the respective one of the separator portions in order to peel, at a speed of 100 mm/min along the stacking axis, the respective one of the separator portions away from a respective one of the electrodes to which it is adhered.

27. The electrode assembly of claim 22, wherein the air permeability of the separator portions has a value in seconds per 100 ml per square inch of the respective separator portion at a pressure of 0.05 MPa, and wherein the value of the air permeability of the separator portions in the first portion corresponding to the first regions is different than the value of the air permeability of the separator portions in the second portion corresponding to the second regions, the difference in the values of the air permeability between the first and second portions being in a range from 2 sec/100 ml to 25 sec/100 ml.

28. The electrode assembly of claim 22, wherein the separator portions are portions of an elongated separator sheet, the elongated separator being folded between each separator portion such that the elongated separator sheet follows a serpentine path traversing back and forth along an orthogonal dimension orthogonal to the stacking axis to extend between each of the successive electrodes in the stack, and wherein each of the electrodes in the stack has a first lateral end and a second lateral end on opposite sides of the respective electrode in the orthogonal dimension.

29. The electrode assembly of claim 28, wherein the stack further includes an outer separator encircling a perimeter of the stack.

30. The electrode assembly of claim 22, wherein each of the electrodes in the stack are thermally bonded to an adjacent one of the separator portions.

* * * * *